R. D. TITTLE.
OPERATING MECHANISM FOR THE DOLLIES OF WASHING MACHINES.
APPLICATION FILED APR. 22, 1909.
937,195.
Patented Oct. 19, 1909.
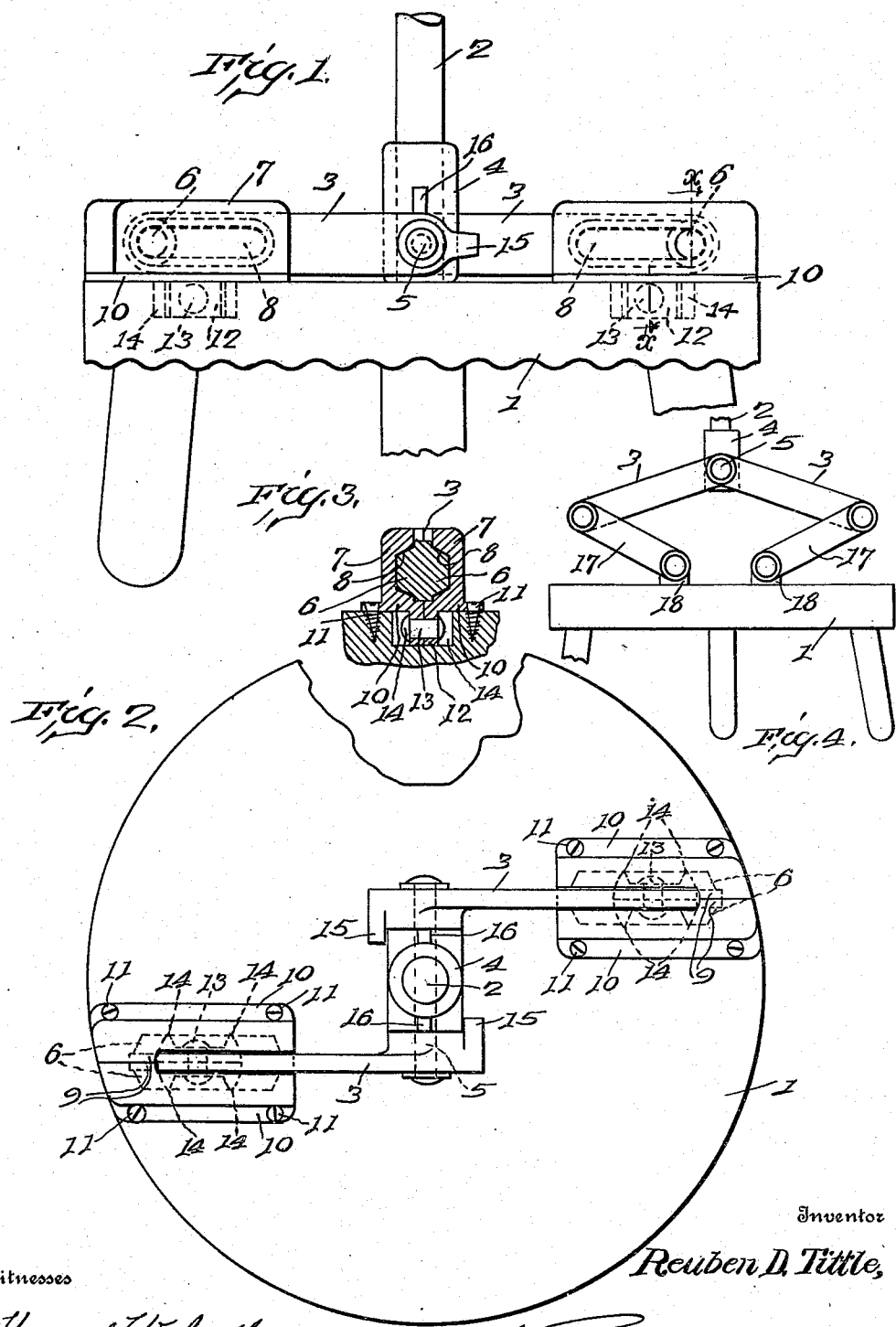

UNITED STATES PATENT OFFICE.

REUBEN D. TITTLE, OF SPRINGFIELD, OHIO.

OPERATING MECHANISM FOR THE DOLLIES OF WASHING-MACHINES.

937,195.

Specification of Letters Patent.   Patented Oct. 19, 1909.

Application filed April 22, 1909.   Serial No. 491,583.

*To all whom it may concern:*

Be it known that I, REUBEN D. TITTLE, a citizen of the United States, residing at Springfield, in the county of Clark and State of Ohio, have invented certain new and useful Improvements in Operating Mechanism for the Dollies of Washing-Machines, of which the following is a specification, reference being had therein to the accompanying drawings.

This invention relates to operating mechanism for the dolly of a washing machine.

In washing machines as at present constructed it is customary to secure the actuating shaft to the dolly by slidably mounting the dolly on the shaft, thereby permitting the dolly to move vertically on the shaft and providing means for holding the same against rotation relatively to the shaft. This construction is open to numerous and obvious objections and the object of the present invention is to provide means for so connecting the actuating shaft to the top of the dolly as to permit the dolly to have a free vertical movement relatively to the shaft, but to hold the dolly against rotary movement relatively to the shaft.

With this object in view my invention consists in certain novel features and in certain combinations and arrangements of parts hereinafter to be described, and then more particularly pointed out in the claims.

In the accompanying drawings, Figure 1 is a side elevation of a dolly embodying my invention; Fig. 2 is a top plan view of the same; Fig. 3 is a transverse sectional view taken on the line *x x* of Fig. 1 and looking in the direction of the arrows; and Fig. 4 is a side elevation of a dolly equipped with a slightly modified form of the invention.

In carrying out my invention I provide suitable connecting members or links which are pivotally connected at one end to the actuating shaft and are movably connected at their opposite ends to the top of the dolly, the nature of this movable connection being such as to permit the ends of the connecting members, which are secured to the shaft, to move in a vertical plane.

In Figs. 1, 2 and 3 I have illustrated one embodiment of my invention and have shown the same as comprising a dolly 1 and an actuating shaft 2. The lower end of the actuating shaft 2 is provided with trunnions on which are mounted the adjacent ends of connecting members or links 3. In the present instance, a sleeve 4 is mounted on the lower end of the actuating shaft 2 and is secured thereto by means of a pin or shaft 5 which extends through the same and through the end of the shaft 2, thus securing the sleeve to the shaft. The opposite ends of the pin or shaft 5 extend beyond the sides of the sleeve 4 and form trunnions upon which are mounted the links 3. The opposite ends of the links are movably connected to the top of the dolly on the opposite sides of the plane of the actuating shaft 2. As shown in Figs. 1, 2 and 3, this connection is a sliding one, and, to form the same, each link 3 is provided with a trunnion 6 arranged near that end thereof opposite the end which is connected to the shaft 2. Suitable guide members are mounted on the top of the housing and provided with guideways within which the trunnions 6 move. In the present instance I have shown these guide members as consisting of housings, each comprising two vertically arranged, substantially parallel plates 7 provided in their adjacent faces with longitudinal grooves or guideways 8 of a character adapted to receive the trunnions 6 of the links 3. The two members 7 of each housing are spaced some distance apart and the space between the same is open for the greater portion of the length of the housing to permit of the free movement of the link 3, but is closed at the outer end of the housing, as shown in Fig. 2, this closure being preferably accomplished by means of flanges 9 extending inwardly from the edges of the two members 7 comprising the housing. Each member of the housing is mounted on a suitable base 10 which extends beyond the side thereof and is secured to the top of the dolly by means of screws 11, or in any other suitable manner. Each member of the housing is also provided with a downwardly extending projection 12 arranged near the inner edge thereof and these projections are adapted to be connected one to the other by means of a rivet or bolt 13, thereby rigidly connecting together the two members of the housing. The depending projections 12 also form a depending lug or boss adapted to extend into an aperture in the top of the dolly and resist any longitudinal strain imposed thereon, thereby relieving the screws 11 of excessive strain. To this end the projections 12 are provided with laterally extending flanges 14 which are so arranged as to form a segmental flange at each end of the boss or projection and cause the same to fit snugly within an ordinary auger hole.

The two housings are, as above stated, mounted on opposite sides of the center of the dolly and are so arranged that, when the trunnions 6 are in the outer ends of the guideways 8, the links 3 will occupy substantially horizontal positions and the shaft 2 will be in its lowermost position. The inward movement of the trunnions 6 may be limited by the ends of the guideways formed in the housing, but I prefer to form a stop therefor, independent of the housing, to positively limit the upward movement of the shaft 2 relatively to the dolly. To this end I have formed at the inner end of each link 3, which lies beyond the pivotal center thereof, a laterally extending projection 15 and have provided on the side of the sleeve 4 carried by the lower end of the shaft 2 stops 16 which lie in the path of the projections 15, and the projections 15 are so arranged relatively to these stops as to engage the same when the trunnions have moved inwardly a predetermined distance, thus positively stopping the movement of the trunnions and preventing the connecting members assuming such a position as to prevent the upward movement of the dolly. It will be apparent, however, that the length of the guideways 8 is such as to permit of a considerable vertical movement of the actuating shaft 2 relatively to the dolly and that the connection between the links and the housings is such as to firmly hold the dolly against rotary movement relatively to the actuating shaft, thus enabling the desired movements to be imparted to the dolly and eliminating the use of operating parts beneath the dolly or which project through the dolly.

It will be obvious that numerous changes can be made in the manner of connecting the shaft 2 with the top of the dolly, and, in Fig. 4, I have shown another way in which this can be accomplished. In this form of the device the links 3 are connected to the actuating shaft 2 in substantially the same manner as that above described, but instead of slidably connecting the lower ends of the links to the dolly, I have movably connected the same thereto by means of other links 17 which are pivotally connected at their outer ends to the links 3 and are pivotally connected at their inner ends to lugs 18 carried by the top of the dolly and arranged a sufficient distance apart to permit of the lower end of the actuating shaft passing between the same, thereby permitting the links 3 and 17 to be moved into substantially horizontal positions.

I wish it to be understood that I do not desire to be limited to the details of construction shown and described, for obvious modifications will occur to a person skilled in the art.

Having thus fully described my invention, what I claim as new and desire to secure by Letters Patent, is:—

1. The combination, with a dolly, and an actuating shaft, of a connecting member having one end connected to said actuating shaft and the other end movably connected to said dolly.

2. The combination, with a dolly, and an actuating shaft, of links pivotally connected to said actuating shaft and movably connected to said dolly.

3. The combination, with a dolly, and an actuating shaft, of links pivotally connected to said actuating shaft and slidably connected to said dolly.

4. The combination, with a dolly, and an actuating shaft, of links each pivotally connected at one end to said shaft and provided with trunnions at the other end, and guide members secured to said dolly and having guideways adapted to receive said trunnions.

5. The combination, with a dolly, and an actuating shaft, of links each pivotally connected at one end to said shaft and provided with trunnions at the other end, housings mounted on the top of said dolly on opposite sides of the center thereof, each comprising two substantially parallel members having longitudinal grooves formed in the adjacent sides thereof and adapted to receive said trunnions.

6. The combination, with a dolly having recesses in the top thereof, and an actuating shaft, of links each pivotally connected at one end to said shaft and provided with trunnions at the other end, housings mounted on top of said dolly and having guideways adapted to receive said trunnions, and a boss depending from each of said housings and adapted to be inserted in one of the recesses in the top of said dolly.

7. The combination, with a dolly having recesses in the top thereof, and an actuating shaft, of links each pivotally connected at one end to said shaft and provided with trunnions at the other end, housings each comprising two parts, each of said parts having a guideway adapted to receive one of said trunnions, a projection depending from each part of each of said housings, and means for connecting together the projections of each of said housings, thereby forming a boss adapted to enter one of the recesses in the top of said dolly.

In testimony whereof I affix my signature in presence of two witnesses.

REUBEN D. TITTLE.

Witnesses:
A. C. LINK,
EDWARD L. REED.